United States Patent
Mori et al.

(10) Patent No.: US 11,180,600 B2
(45) Date of Patent: Nov. 23, 2021

(54) TWO-PART CURABLE URETHANE COMPOSITION

(71) Applicant: Showa Denko Materials Co., Ltd., Tokyo (JP)

(72) Inventors: Kazuhiko Mori, Tokyo (JP); Yuya Hiramoto, Tokyo (JP); Hisao Matsumiya, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/464,842

(22) PCT Filed: Nov. 30, 2016

(86) PCT No.: PCT/JP2016/085557
§ 371 (c)(1),
(2) Date: May 29, 2019

(87) PCT Pub. No.: WO2018/100674
PCT Pub. Date: Jun. 7, 2018

(65) Prior Publication Data
US 2019/0292300 A1    Sep. 26, 2019

(51) Int. Cl.
| | | |
|---|---|---|
| *C08G 18/10* | (2006.01) | |
| *C08K 3/014* | (2018.01) | |
| *C08K 3/013* | (2018.01) | |
| *C08K 3/016* | (2018.01) | |
| *C08G 18/18* | (2006.01) | |
| *C08G 18/38* | (2006.01) | |
| *C08G 18/48* | (2006.01) | |
| *C08G 18/76* | (2006.01) | |
| *C08G 18/79* | (2006.01) | |
| *C08K 3/04* | (2006.01) | |
| *C08K 5/5419* | (2006.01) | |
| *C09J 175/04* | (2006.01) | |
| *C08G 18/20* | (2006.01) | |
| *C08G 18/28* | (2006.01) | |
| *C08G 18/72* | (2006.01) | |
| *C08G 18/50* | (2006.01) | |
| *C08L 67/08* | (2006.01) | |

(52) U.S. Cl.
CPC ............. *C08G 18/10* (2013.01); *C08G 18/18* (2013.01); *C08G 18/1866* (2013.01); *C08G 18/2018* (2013.01); *C08G 18/2081* (2013.01); *C08G 18/289* (2013.01); *C08G 18/3876* (2013.01); *C08G 18/3893* (2013.01); *C08G 18/48* (2013.01); *C08G 18/482* (2013.01); *C08G 18/4829* (2013.01); *C08G 18/5021* (2013.01); *C08G 18/721* (2013.01); *C08G 18/7628* (2013.01); *C08G 18/7671* (2013.01); *C08G 18/79* (2013.01); *C08G 18/792* (2013.01); *C08G 18/794* (2013.01); *C08K 3/013* (2018.01); *C08K 3/014* (2018.01); *C08K 3/016* (2018.01); *C08K 3/04* (2013.01); *C08K 5/5419* (2013.01); *C08L 67/08* (2013.01); *C09J 175/04* (2013.01)

(58) Field of Classification Search
CPC .......................... C08G 18/10; C08G 18/1866; C08G 18/3893; C08G 18/4829; C08G 18/7628; C08G 18/79; C08G 18/48; C08G 18/794; C08G 18/2081; C08G 18/3876; C08G 18/289; C08G 18/792; C08G 18/721; C08G 18/5021; C08G 18/482; C08G 18/2018; C08G 18/7671; C08K 3/013; C08K 3/014; C08K 3/016; C08K 3/04; C08K 5/5419; C09J 175/04; C08L 67/08
See application file for complete search history.

(56) References Cited

U.S. PATENT DOCUMENTS

2015/0140324 A1 * 5/2015 Kishimoto ................. C09J 7/25
428/336

FOREIGN PATENT DOCUMENTS

| CN | 103261252 A | 8/2013 |
|---|---|---|
| JP | 2004-131625 A | 4/2004 |
| JP | 2006-111811 A | 4/2006 |
| JP | 2006-273973 A | 10/2006 |
| JP | 2008-38019 A | 2/2008 |
| JP | 2008-87406 A | 4/2008 |

* cited by examiner

*Primary Examiner* — Patrick D Niland
(74) *Attorney, Agent, or Firm* — Faegre Drinker Biddle & Reath LLP

(57) ABSTRACT

A two-part curable urethane composition comprising a main agent (A) and a curing agent (B), wherein the main agent (A) contains a urethane prepolymer (a), an isocyanurate-modified polyisocyanate compound (b), and a silane coupling agent (c) at a specified ratio by mass; and the curing agent (B) contains a polyether polyol (d), a polyether polyol having 4 or more hydroxy groups (e), and an amine catalyst (f) at a specified ratio by mass.

8 Claims, No Drawings

TWO-PART CURABLE URETHANE COMPOSITION

TECHNICAL FIELD

The present invention relates to a two-part curable urethane composition.

BACKGROUND ART

Although interior and exterior components of an automobile such as a body, a front door, a rear door, a back door, a front bumper, a rear bumper and a rocker molding are generally made of steel plate, lightweight components are required to meet the recent demand for improvement in fuel efficiency. Use of plastic materials such as polypropylene to replace steel plates for interior and exterior components of an automobile has therefore increased. Incidentally, since plastic materials such as polypropylene have lower strength than steel plates, talc and glass filler are usually added thereto to enhance the strength.

As the adhesive between plastic components of an automobile, for example, made of polypropylene, urethane compositions have been proposed.

Examples of the known urethane compositions include one-part adhesives referred to as moisture cure adhesives that are cured by moisture in air, and two-part adhesives consisting of an isocyanate compound and a polyol compound. Among them, from the perspective of workability in the adhesion step, two-part adhesives are preferred, allowing a sufficient usable time (pot life: time until a multi-part coating material starts to be cured through chemical reactions or the like) to be secured and fast curing to be achieved.

A polypropylene substrate has a surface with a small polarity to be hardly bonded, so that a surface treatment for introducing polar groups to the substrate surface is usually performed to facilitate adhesion. Examples of the treatment applied to the surface include a plasma treatment, a corona treatment, and a flame treatment. Further, due to difficulty in direct application of a urethane composition for adhesion of surface-treated polypropylene substrates to each other, each of the polypropylene substrates is usually subjected to a primer treatment as pretreatment before application of the urethane composition. However, from the perspective of process simplification and improvement in working environment, no use of primer is recently required.

Examples of the performance required for a cured adhesive include adhesiveness, fast curability, warm water resistance, fatigue resistance, and thermal creep resistance. Since an automobile may be exposed to a harsh environment such as high temperature and high humidity environment, an adhesive is required to have properties hardly deteriorated under high temperature and high humidity environment (hereinafter, also referred to as "hydrothermal aging resistance), in particular. For example, the adhesiveness is required not to be impaired, even when left standing under conditions at 85° C., 85% RH (relative humidity) for 300 hours.

To fulfill these various properties, carbon black is usually compounded in urethane compositions. Thereby, the mechanical strength of the urethane compositions is improved, and the viscosity and thixotropic properties excellent in terms of handling can be imparted.

For example, in Patent Literature 1, a non-primer adhesive made of one-part moisture curable urethane resin composition is disclosed, and in Patent Literature 2, a two-part curable composition made of a main agent (first liquid) containing an isocyanate compound and a curing agent (second liquid) containing ketimine to be mixed during working is disclosed.

CITATION LIST

Patent Literature

Patent Literature 1: Japanese Unexamined Patent Publication No. 2008-38019
Patent Literature 2: Japanese Unexamined Patent Publication No. 2004-131625

SUMMARY OF INVENTION

Technical Problem

However, since the non-primer adhesive in Patent Literature 1 is a one-part adhesive, the workability may be reduced due to a short pot life. Further, as a result of examination by the present inventors, it was found that the non-primer adhesive in Patent Literature 1 leaves room for improvement in the hydrothermal aging resistance.

Furthermore, although there is no comment on primers in Patent Literature 2, as a result of examination by the present inventors, it was found that the two-part curable composition in Patent Literature 2 has difficulty in making adhesion between polypropylene substrates without primer treatment.

An object of the present disclosure is, therefore, to provide a two-part curable urethane composition excellent in fast curability, non-primer adhesiveness and hydrothermal aging resistance.

Solution to Problem

Through extensive investigation, the present inventors have found that two-part curable urethane compositions shown in the following items [1] to [4] are excellent in fast curability, non-primer adhesiveness and hydrothermal aging resistance.

[1] A two-part curable urethane composition comprising a main agent (A) and a curing agent (B), wherein
the main agent (A) contains a urethane prepolymer (a), an isocyanurate-modified polyisocyanate compound (b), and a silane coupling agent (c), and a content of the isocyanurate-modified polyisocyanate compound (b) is 0.5 to 5.0 parts by mass relative to 100 parts by mass of the urethane prepolymer (a) and a content of the silane coupling agent (c) is 0.5 to 5.0 parts by mass relative to 100 parts by mass of the urethane prepolymer (a), and
the curing agent (B) contains a polyether polyol (d), a polyether polyol having 4 or more hydroxy groups (e), and an amine catalyst (f), and a content of the a polyether polyol having 4 or more hydroxy groups (e) is 1.0 to 5.0 parts by mass relative to 100 parts by mass of the polyether polyol (d) and a content of the amine catalyst (f) is 1.0 to 10.0 parts by mass relative to 100 parts by mass of the polyether polyol (d).

[2] The two-part curable urethane composition according to item [1], wherein the urethane prepolymer (a) is a reaction product of a polyether polyol (a-1) having a weight average molecular weight of 8,000 or more and a diphenylmethane diisocyanate (a-2).

[3] The two-part curable urethane composition according to item [1] or [2], wherein at least one of the main agent (A) and the curing agent (B) contains a carbon black (g), and a total content of the carbon black (g) is 10 to 30 mass % relative to the total amount of the main agent (A) and the curing agent (B).

[4] The two-part curable urethane composition according to any one of items [1] to [3], having an equivalent ratio of NCO/OH groups of 1.0 to 1.5 in the main agent (A) and the curing agent (B).

Advantageous Effects of Invention

The two-part curable urethane composition of the present disclosure is excellent in fast curability, non-primer adhesiveness and hydrothermal aging resistance.

DESCRIPTION OF EMBODIMENTS

Preferred embodiments of the present disclosure are described below, though the present disclosure is not limited to the embodiments. In the present specification, a numerical range shown by using "to" indicates a range including the respective numerical values prepositioned and post-positioned relative to "to" as the minimum and the maximum. In the numerical range shown stepwise in the present specification, the upper limit or the lower limit of the numerical range in a step may be replaced with the upper limit or the lower limit of the numerical range in another step. Also, in the numerical range shown in the present specification, the upper limit or the lower limit of the numerical range may be replaced with the value shown in Examples.

The two-part curable urethane composition of the present embodiment (hereinafter also referred to simply as "urethane composition") comprises a main agent (A) and a curing agent (B). The urethane composition can be cured by mixing the main agent (A) and the curing agent (B).

The main agent (A) contains a urethane prepolymer (a), an isocyanurate-modified polyisocyanate compound (b), and a silane coupling agent (c). The curing agent (B) contains a polyether polyol (d), a polyether polyol having 4 or more hydroxy groups (e), and an amine catalyst (f). It is preferable that at least one of the main agent (A) and the curing agent (B) contain a carbon black (g) and/or a plasticizer (h). Each of the components is described as follows.

<Urethane Prepolymer (a)>

The urethane prepolymer (a) is a reaction product of a compound having two or more active hydrogen groups and a polyisocyanate compound having two or more isocyanate groups.

Examples of the active hydrogen groups include a hydroxy group (OH group), a carboxyl group (COOH group), an amino group ($NH_2$ group), and a thiol group (SH group). As the compound having two or more active hydrogen groups, a polyol is preferred, and a polyether polyol (a-1) is more preferred.

Examples of the polyisocyanate compound include an aromatic polyisocyanate having an isocyanate group bonded to an aromatic hydrocarbon, and an aliphatic polyisocyanate having an isocyanate group bonded to an aliphatic hydrocarbon. Among them, an aromatic polyisocyanate is preferred, a diphenylmethane diisocyanate (a-2) or dicyclohexylmethane diisocyanate ($H_{12}MDI$) is more preferred, and a diphenylmethane diisocyanate (a-2) is still more preferred.

<Polyether Polyol (a-1)>

The polyether polyol (a-1) is not particularly limited, so long as the polyether polyol has two or more OH groups. Specific examples thereof include polyethylene glycol (PEG), polypropylene glycol (PPG), an ethylene oxide/propylene oxide copolymer, polytetramethylene ether glycol (PTMEG), and a sorbitol polyol. Among these, polypropylene glycol (PPG) is preferred. The polyether polyol (a-1) may be used singly or in combination of two or more thereof.

It is preferable that the polyether polyol (a-1) have a weight average molecular weight of 8,000 or more, and it is more preferable that the weight average molecular weight be 10,000 or more. With a weight average molecular weight of the polyether polyol of 8,000 or more, the cohesive force of the prepolymer does not excessively increase when urethanized, so that excellent thermal creep resistance can be achieved. The polyether polyol can be highly polymerized by reducing the amount of by-products generated during the production process to achieve a narrower variation. The highest weight average molecular weight of currently commercially available PPG (polypropylene glycol) is about 15,000. Examples of the commercially available high molecular weight polyether polyol for use include PREMINOL (registered trademark, the same applies to the following) manufactured by AGC Chemicals Company. PREMINOL 3012 for use in Examples is a polymer of polypropylene glycol produced by using glycerol as an initiator.

In the present specification, the term "weight average molecular weight" is a value obtained utilizing gel permeation chromatography (GPC) and calculated using a calibration curve of the standard polystyrene.

The GPC measurement conditions are as follows.
Measurement apparatus: HLC-8120 (manufactured by Tosoh Corporation)
Column: TSK guard column HXL-L (manufactured by Tosoh Corporation)
Carrier: tetrahydrofuran (THF)
Detector: differential refractometer
Sample: 0.1 mass % solution in THF
Calibration curve: polystyrene <Diphenylmethane Diisocyanate (a-2)>

Examples of the diphenylmethane diisocyanate (a-2) include 4,4'-diphenylmethane diisocyanate (4,4'-MDI(monomeric MDI)), and 2,4'-diphenylmethane diisocyanate (2,4'-MDI).

<Isocyanurate-Modified Polyisocyanate Compound (b)>

Examples of the isocyanurate-modified polyisocyanate compound (b) include trimers of various polyisocyanate compounds such as toluene diisocyanate (MI), hexamethylene diisocyanate (HDI), xylene diisocyanate (XDI), naphthalene diisocyanate (NDI), and isophorone diisocyanate (IPDI). The trimer may be a timer of one polyisocyanate compound, or may be mixed trimers of two or more polyisocyanate compounds, for example, HDI and TDI. All of the three terminal functional groups of the trimer are isocyanate groups (NCO groups).

As the isocyanurate-modified polyisocyanate compound (b), a commercially available product such as a TDI isocyanurate (TAKENATE D204, manufactured by Mitsui Chemicals SKC Polyurethanes, Inc.), an HDI isocyanurate (SUMIDUR N3300, manufactured by Sumika Bayer Urethane Co., Ltd.), an IPDI isocyanurate (T1890, manufactured by Evonik Japan Co., Ltd.), and mixed isocyanurates of HDI and TDI (DESMODUR HL, manufactured by Sumika Bayer Urethane Co., Ltd.) may be used.

Addition of the isocyanurate-modified polyisocyanate compound (b) allows the non-primer adhesiveness and the hydrothermal aging resistance to be improved. The reason for improvement in the non-primer adhesiveness is presumed as follows. The three NCO groups present in an isocyanurate-modified molecule form urethane bonds in the urethane composition, and further form urethane bonds with polar groups introduced through a flame treatment of the surface of a polypropylene substrate, so that the interfacial adhesive strength can be enhanced.

Also, the reason for improvement in the hydrothermal aging resistance is presumed that the isocyanurate rings present in the isocyanurate-modified compound contribute to development of the cohesive force in the urethane composition.

The content of the isocyanurate-modified polyisocyanate compound (b) in the urethane compound is 0.5 to 5.0 parts by mass relative to 100 parts by mass of the urethane prepolymer (a). With a content of the isocyanurate-modified polyisocyanate compound (b) less than 0.5 parts by mass, the abundance of isocyanurate rings in the urethane composition decreases to lower the cohesive force, so that the hydrothermal aging resistance of the adhesive deteriorates. With a content of the isocyanurate-modified polyisocyanate compound (b) more than 5.0 parts by mass, the abundance of NCO groups in the urethane composition increases, so that the degree of cure increases when the urethane composition is cured. As a result, when the adhesive is peeled away from the substrate, a stress is concentrated on the interface between the substrate and the adhesive, so that an interfacial fracture may occur between the substrate and the adhesive. In other words, the adhesiveness of the adhesive deteriorates.

It is more preferable that the content of the isocyanurate-modified polyisocyanate compound (b) be 1.0 to 4.5 parts by mass from the perspective of further improvement in the non-primer adhesiveness and the hydrothermal aging resistance.

<Silane Coupling Agent (c)>

The silane coupling agent (c) is an organic silicon compound having two types of functional groups having different reactivity in a molecule. Examples of the silane coupling agent (c) include epoxysilane, vinylsilane, imidazolesilane, mercaptosilane, aminosilane, styrylsilane, isocyanatesilane, sulfidesilane and ureidosilane.

The silane coupling agent (c) forms urethane bonds and siloxane bonds in the urethane composition, and forms covalent bonds with polar groups introduced to the surface of the polypropylene substrate. The silane coupling agent (c) therefore contributes to adhesion between the urethane composition and the polypropylene substrate. The silane coupling agents (c) may be used singly or in combination of two or more thereof.

The content of the silane coupling agent (c) in the urethane composition is 0.5 to 5.0 parts by mass relative to 100 parts by mass of the urethane prepolymer (a). With a content of the silane coupling agent (c) less than 0.5 parts by mass, the adhesive strength between the urethane composition and the polypropylene substrate decreases, so that the non-primer adhesiveness between the polypropylene substrate and the adhesive decreases under high temperature (60 to 100° C.), in particular. A content of the silane coupling agent (c) more than 5.0 parts by mass tends to lower the cohesive force developed by the urethane composition, so that the thermal creep resistance of the adhesive decreases.

It is preferable that the content of the silane coupling agent (c) be 1.0 to 4.0 parts by mass from the perspective of further improvement in the non-primer adhesiveness and the thermal creep resistance.

<Polyether Polyol (d)>

The polyether polyol (d) is not particularly limited, so long as it has two or three hydroxy groups. Specifically, compounds similar to the polyether polyol (a-1) can be suitably used. The polyether polyol (a-1) and the polyether polyol (d) may be the same or different.

<Polyether Polyol Having 4 or More Hydroxy Groups (e)>

The types of polyether polyols having 4 or more hydroxy groups (e) are not particularly limited, and examples thereof include polyether polyols as reaction products of aliphatic, alicyclic or aromatic polyols having 4 or more active hydrogen groups and alkylene oxides, and amine polyether polyols as reaction products of aliphatic, alicyclic or aromatic polyamines having 4 or more active hydrogen groups and alkylene oxides. Among them, amine polyether tetraols as reaction products of alkylene diamines (aliphatic diamines) and alkylene oxides are preferred to improve the curing rate of urethane reaction and increase the crosslink density. It is preferable that the alkylene group of the alkylene diamines have 2 to 6 carbon atoms and the alkylene group of the alkylene oxides have 2 to 4 carbon atoms. These may be used singly or in combination of two or more thereof.

As the amine polyether polyols having 4 or more hydroxy groups which are commercially available, for example, polyether tetraols in ADEKA polyether EDP series produced by adding propylene oxides to active hydrogens of ethylene diamines can be used.

Addition of the polyether polyol having 4 or more hydroxy groups (e) improves the hydrothermal aging resistance.

The reason for the improvement in the hydrothermal aging resistance is presumed as follows. Compounding of polyether polyols having many hydroxy groups in a molecule, i.e., having a small OH equivalent, allows the crosslink density of the cured urethane composition to increase more than those without compounding of the polyether polyols having 4 or more hydroxy groups (e), so that the excellent hardness and hydrothermal aging resistance can be obtained.

It is preferable that the polyether polyols having 4 or more hydroxy groups (e) have a weight average molecular weight of 100 to 2000.

With a weight average molecular weight of the polyether polyols having 4 or more hydroxy groups (e) in the specified range, the hardness of the cured urethane composition is adjusted to a more suitable range, so that the adhesiveness between the substrate and the adhesive and the hydrothermal aging resistance of the adhesive are further improved.

The content of the polyether polyols having 4 or more hydroxy groups (e) in the urethane composition is 1.0 to 5.0 parts by mass relative to 100 parts by mass of the polyether polyols (d).

With a content of the polyether polyols having 4 or more hydroxy groups (e) less than 1.0 part by mass, the hardness of the cured urethane composition excessively decreases, so that excellent hydrothermal aging resistance of the adhesive may not be obtained. Meanwhile, with a content of the polyether polyols having 4 or more hydroxy groups (e) more than 5.0 part by mass, the hardness of the cured urethane composition excessively increases, so that excellent adhesion between the substrate and the adhesive cannot be obtained.

The content of the polyether polyols having 4 or more hydroxy groups (e) is preferably 1.5 to 4.5 parts by mass, more preferably 2.0 to 4.0 parts by mass, from the perspective of further improvement in the hydrothermal aging resistance.

<Amine Catalyst (f)>

As the amine catalyst (f), a known catalyst which accelerates a urethanization reaction or a urea-forming reaction can be used. It is preferable that the amine catalyst (f) be a tertiary amine, from the perspective of enhancement of a urethanization reactivity and a urea-forming reactivity.

Specific examples of the amine catalyst (f) include N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, bis(2-dimethylaminoethyl)ether, 1-methylimidazole, 1,2-dimethylimidazole, 1-isobutyl-2-methylimidazole, 1-dimethylaminopropylimidazole, N,N-dimethylethanolamine, N,N-dimethylisopropanolamine, N,N-dimethylhexanolamine, N,N-dimethylaminoethoxyethanol, N,N,N'-trimethyl-N'-(2-hydroxyethyl)ethylenediamine, N,N,N'-trimethyl-N'-(2-hydroxyethyl)propanediamine, N-methyl-N'-(2-hydroxyethyl)piperazine, bis(dimethylaminopropyl)methylamine, bis(dimethylaminopropyl)isopropanolamine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, 3-quinuclidinol, and 2,2'-dimorpholinodiethyl ether.

The amine catalyst (f) may be used singly or in combination of two or more thereof.

The content of the amine catalyst (f) in the urethane composition is 1.0 to 10.0 parts by mass, preferably 2.0 to 9.0 parts by mass, more preferably 3.0 to 8.0 parts by mass, relative to 100 parts by mass of the polyether polyol (d). With a content of the amine catalyst (f) less than 1.0 part by mass, the rate of curing reaction of the adhesive is significantly reduced, so that the workability deteriorates. Meanwhile, with a content of the amine catalyst (f) more than 10.0 parts by mass, the time available for lamination decreases, resulting in unfavorable workability.

<Carbon Black (g)>

The carbon black (g) has an average particle size (D50: particle size corresponding to the 50% value of the volume particle size distribution curve) of, preferably 20 to 40 nm, more preferably 25 to 35 nm. With an average particle size of the carbon black in the specified range, the viscosity of the adhesive and the dispersibility of the carbon black can be adjusted to a more appropriate range, so that the workability and the strength of the adhesive can be further improved. Incidentally, the average particle size (D50) of the carbon black can be measured, for example, by a laser diffraction/scattering method, for example, using "Model LS-230" manufactured by Beckman Coulter Inc.

As the carbon black, commercially available products such as ASAHI CARBON #70 (manufactured by Asahi Carbon Co., Ltd.), SEAST 3 (manufactured by Tokai Carbon Co., Ltd., "SEAST" is a registered trademark), MITSUBISHI CARBON #32 (manufactured by Mitsubishi Chemical Corporation), and NITERON #200 (manufactured by Nippon Steel Carbon Co., Ltd., "NITERON" is a registered trademark) can be suitably used.

The total content of the carbon black (g) in the main agent (A) and the curing agent (B) of the urethane composition is preferably 10 to 30 mass %, more preferably 10 to 25 mass %, relative to the total amount of the main agent (A) and the curing agent (B). With a content of the carbon black (g) in the range, the adhesive can have further improved strength, thixotropic properties for achieving excellent workability when uncured, foaming resistance during curing, and high strength and high weather resistance resulting from light-shielding effect, i.e., durable weather resistance, after curing, which are favorable.

<Plasticizer (h)>

Examples of the plasticizer (h) include phthalic acid ester compounds, alkylsulfonic acid ester compounds, and adipic acid ester compounds. Specific examples of the phthalic acid ester compounds include dioctyl phthalate (DOP), dibutyl phthalate (DBP), diisononyl phthalate (DINP), diisodecyl phthalate (DIDP) and butylbenzyl phthalate (BBP).

The urethane composition of the present embodiment may further contain additives such as pigments, dyes, anti-aging agents, antioxidants, antistatic agents, flame retardants, tackifiers, dispersing agents and solvents, in addition to the components described above.

It is preferable that the equivalent ratio of NCO/OH groups, i.e., an abundance ratio between isocyanate groups (NCO) and hydroxy groups (OH) in the main agent (A) and the curing agent (B), be 1.0 to 1.5. With an equivalent ratio of NCO/OH groups in the specified range, the adhesiveness of the adhesive and the workability in the adhesion step are improved. Incidentally, the isocyanate groups are mainly derived from the urethane prepolymer (a) and the isocyanurate-modified polyisocyanate compound (b), and the hydroxy groups are mainly derived from the polyether polyol (d) and the polyether polyol having 4 or more hydroxy groups (e).

EXAMPLES

The object and the advantage of the present disclosure are further described in detail with reference to Examples as follows, though the present disclosure is not limited to Examples.

(Preparation of Main Agent Intermediate)

A kneading vessel having a stirrer, a nitrogen inlet tube, a vacuum pump and a heating/cooling device was charged with 90.9 g of PREMINOL 3012 (polyether polyol manufactured by AGC Chemicals Company, weight average molecular weight (Mw): 12000, tri-functional), 24.0 g of MITSUBISHI CARBON #32 (carbon black manufactured by Mitsubishi Chemical Corporation, average particle size: 28 nm), and 20.0 g of DINP (diisononyl phthalate, manufactured by J-PLUS Co., Ltd.), and the mixture was stirred for 30 minutes until disappearance of the lumps of carbon black. Subsequently, the kneading vessel was heated until the content temperature reached 100° C., and after the internal pressure of the kneading vessel was reduced to 20 mmHg with a vacuum pump, the mixture was kept stirred for one hour. Furthermore, the content was cooled to a temperature of 70° C., and 9.1 g of MILLIONATE MT (4,4'-diphenylmethane diisocyanate (monomeric MDI) manufactured by Tosoh Corporation; "MILLIONATE" is a registered trademark; NCO: 33.6%) and 200 ppm (relative to the weight of urethane prepolymer) of a tin catalyst (NIKKA OCTHIX tin) were added into the vessel. After introduction of nitrogen, the mixture was kept stirred for 1 hour. Finally, the content was cooled to a temperature of 40° C. The product was used as a main agent intermediate.

(Preparation of Curing Agent Intermediate)

A kneading vessel having a stirrer, a nitrogen inlet tube, a vacuum pump and a heating/cooling device was charged with 100.0 g of PREMINOL 3012 (polyether polyol manufactured by AGC Chemicals Company, weight average molecular weight (Mw): 12000, tri-functional), 40.0 g of ASAHI CARBON #70 (carbon black manufactured by Asahi Carbon Co., Ltd., average particle size: 28 nm), and 90.0 g of DINP (diisononyl phthalate, manufactured by J-PLUS Co., Ltd.), and the mixture was stirred for 30 minutes until disappearance of the lumps of carbon black. Subsequently, the kneading vessel was heated until the content temperature reached 100° C., and after the internal pressure of the kneading vessel was reduced to 20 mmHg with a vacuum pump, the mixture was kept stirred for one hour. Furthermore, the content was cooled to a temperature of 40° C. The product was used as a curing agent intermediate.

Example 1

(Main Agent #1)
To the main agent intermediate, 2.5 g of KBM-803 (mercaptosilane, manufactured by Shin-Etsu Chemical Co., Ltd.) and 1.5 g of SUMIDUR N3300 (HDI isocyanurate, manufactured by Sumika Bayer Urethane Co., Ltd.) were added, and the mixture was stirred for 10 minutes.
(Curing Agent #1)
To the curing agent intermediate, 2.5 g of ADEKA polyether EDP-300 (ethylenediamine PPG, manufactured by ADEKA Corporation) and 5.0 g of U-CAT660M (2,2'-dimorpholinodiethyl ether, manufactured by San-Apro Ltd.) were added, and the mixture was stirred for 10 minutes.

Example 2

(Main Agent #2)
To the main agent intermediate, 3.0 g of KBM-573 (aminosilane, manufactured by Shin-Etsu Chemical Co., Ltd.) and 4.3 g of TAKENATE D204 (TDI isocyanurate, manufactured by Mitsui Chemicals SKC Polyurethanes, Inc.) were added, and the mixture was stirred for 10 minutes.
(Curing Agent #2)
To the curing agent intermediate, 4.0 g of ADEKA polyether EDP-1100 (ethylenediamine PPG, manufactured by ADEKA Corporation) and 6.0 g of U-CAT660M (2,2'-dimorpholinodiethyl ether, manufactured by San-Apra Ltd.) were added, and the mixture was stirred for 10 minutes.

Example 3

(Main Agent #3)
To the main agent intermediate, 1.0 g of KBM-803 (mercaptosilane, manufactured by Shin-Etsu Chemical Co., Ltd.), 1.5 g of KBM-573 (aminosilane, manufactured by Shin-Etsu Chemical Co., Ltd.), and 3.5 g of SUMIDUR N3300 (HDI isocyanurate, manufactured by Sumika Bayer Urethane Co., Ltd.) were added, and the mixture was stirred for 10 minutes.
(Curing Agent #3)
To the curing agent intermediate, 3.5 g of ADEKA polyether EDP-1100 (ethylenediamine PPG, manufactured by ADEKA Corporation) and 3.2 g of U-CAT660M (2,2'-dimorpholinodiethyl ether, manufactured by San-Apro Ltd.) were added, and the mixture was stirred for 10 minutes.

Example 4

(Main Agent #4)
To the main agent intermediate, 4.0 g of KBM-803 (mercaptosilane, manufactured by Shin-Etsu Chemical Co., Ltd.) and 2.0 g of TAKENATE D204 (TDI isocyanurate, manufactured by Mitsui Chemicals SKC Polyurethanes, Inc.) were added, and the mixture was stirred for 10 minutes.
(Curing Agent #4)
To the curing agent intermediate, 1.5 g of ADEKA polyether EDP-300 (ethylenediamine PPG, manufactured by ADEKA Corporation), 2.0 g of ADEKA polyether EDP-1100 (ethylenediamine PPG, manufactured by ADEKA Corporation) and 7.0 g of U-CAT660M (2,2'-dimorpholinodiethyl ether, manufactured by San-Apro Ltd.) were added, and the mixture was stirred for 10 minutes.

Comparative Example 1

(Main Agent #5)
To the main agent intermediate, 3.0 g of KBM-573 (aminosilane, manufactured by Shin-Etsu Chemical Co., Ltd.), and 1.5 g of DESMODUR N3200, (HDI biuret, manufactured by Sumika Bayer Urethane Co., Ltd.) were added, and the mixture was stirred for 10 minutes.
(Curing Agent #5)
To the curing agent intermediate, 2.5 g of ADEKA polyether EDP-300 (ethylenediamine PPG, manufactured by ADEKA Corporation) and 5.0 g of U-CAT660M (2,2'-dimorpholinodiethyl ether, manufactured by San-Apro Ltd.) were added, and the mixture was stirred for 10 minutes.

Comparative Example 2

(Main Agent #6)
To the main agent intermediate, 3.0 g of KBM-803 (mercaptosilane, manufactured by Shin-Etsu Chemical Co., Ltd.), and 2.0 g of SUMIDUR N3300, (HDI isocyanurate, manufactured by Sumika Bayer Urethane Co., Ltd.) were added, and the mixture was stirred for 10 minutes.
(Curing Agent #6)
To the curing agent intermediate, 6.0 g of ADEKA polyether EDP-300 (ethylenediamine PPG, manufactured by ADEKA Corporation) and 3.0 g of U-CAT660M (2,2'-dimorpholinodiethyl ether, manufactured by San-Apro Ltd.) were added, and the mixture was stirred for 10 minutes.

Comparative Example 3

(Main Agent #7)
To the main agent intermediate, 2.0 g of KBM-803 (mercaptosilane, manufactured by Shin-Etsu Chemical Co., Ltd.) and 1.5 g of TAKENATE D204 (TDI isocyanurate, manufactured by Mitsui Chemicals SKC Polyurethanes, Inc.) were added, and the mixture was stirred for 10 minutes.
(Curing Agent #7)
To the curing agent intermediate, 3.0 g of ADEKA polyether EDP-1100 (ethylenediamine PPG, manufactured by ADEKA Corporation), 0.5 g of U-CAT660M (2,2'-dimorpholinodiethyl ether, manufactured by San-Apro Ltd.) were added, and the mixture was stirred for 10 minutes.

[Fast Curability]
The main agent and the curing agent corresponding to Examples 1 to 4 and Comparative Examples 1 to 3 were mixed with a planetary apparatus to prepare a urethane composition. The urethane composition was directly applied in a bead form to a polypropylene substrate after flame treatment with a gas burner, and a release paper laminated thereon was pressure bonded, such that the adhesive had a thickness of 3 mm. The sample was then put in a dryer at 60° C. for 10 minutes to be cured, so that a fast curability measurement sample (size: 25 mm by 100 mm) was obtained. The sample was subjected to a peeling test with knife cutting for evaluation on the non-primer adhesiveness.

The adhesiveness of an adhesive was evaluated as "A" when a cohesive failure occurred in the bonded portion, and evaluated as "B" when interfacial failure (peeling) occurred between the surface of a polypropylene substrate and the adhesive.

[Non-Primer Adhesiveness]

The main agent and the curing agent corresponding to Examples 1 to 4 and Comparative Examples 1 to 3 were mixed with a planetary apparatus to prepare a urethane composition. The urethane composition was directly applied in a bead form to a polypropylene substrate after flame treatment with a gas burner, and a release paper laminated thereon was pressure bonded, such that the adhesive had a thickness of 3 mm. The sample was then left standing at 23° C. and 50% RH (relative humidity) for 72 hours to be cured, so that a coated sample after curing was obtained. The sample (sample size: 25 mm by 100 mm) was subjected to a peeling test with knife cutting for evaluation on the non-primer adhesiveness.

The adhesiveness of an adhesive was evaluated as "A" when a cohesive failure occurred in the bonded portion, and evaluated as "B" when interfacial failure (peeling) occurred between the surface of a polypropylene substrate and the adhesive.

[Hydrothermal Aging Resistance]

The main agent and the curing agent corresponding to Examples 1 to 4 and Comparative Examples 1 to 3 were mixed with a planetary apparatus to prepare a urethane composition. The urethane composition was directly applied in a bead form to a polypropylene substrate after flame treatment with a gas burner, and a release paper laminated thereon was pressure bonded, such that the adhesive had a thickness of 3 mm. The sample was then left standing at 23° C. and 50% RH (relative humidity) for 72 hours to be cured, so that a coated sample after curing was obtained. The coated sample (size: 25 mm by 100 mm) was left standing at 85° C. and 85% RH (relative humidity) for 300 hours to be subjected to hydrothermal aging, so that a coated sample after hydrothermal aging was obtained. The sample was subjected to a peeling test with knife cutting for evaluation on the hydrothermal aging resistance.

The adhesiveness of an adhesive was evaluated as "A" when a cohesive failure occurred in the bonded portion, and evaluated as "B" when interfacial failure (peeling) occurred between the surface of a polypropylene substrate and the adhesive.

[Shore A Hardness]

The main agent and the curing agent corresponding to Examples 1 to 4 and Comparative Examples 1 to 3 were mixed with a planetary apparatus to prepare a urethane composition. A sample for evaluation was made by applying the urethane composition to an untreated polypropylene substrate so as to have an adhesive thickness of 3 mm, and stacking the coated products to an adhesive thickness of 12 mm or more. The sample thus made for evaluation was left standing at 23° C. and 50% RH (relative humidity) for 72 hours, and the Shore A hardness of the adhesive layer was measured in accordance with JIS K6253, with a Shore A durometer.

Compounding and addition of materials are shown in Table 1, and evaluation results are shown in Table 2.

TABLE 1

| | | | | | Amount added (g) | | | | | | |
|---|---|---|---|---|---|---|---|---|---|---|---|
| | | | | | Example | | | | Comparative Example | | |
| Type 1 | Type 2 | Symbol | Material name | Article name/Article number | 1 | 2 | 3 | 4 | 1 | 2 | 3 |
| Main agent | Intermediate | (a) | Urethane prepolymer | Synthesized in-house | | | | | 100 | | |
| | | (a-1) | Polyether polyol | PREMINOL 3012 | | | | | 90.9 | | |
| | | (a-2) | 4,4'-Diphenylmethane diisocyanate | MILLIONATE MT | | | | | 9.1 | | |
| | | (g) | Carbon black | MITSUBISHI CARBON #32 | | | | | 24 | | |
| | | (h) | Plasticizer | Diisononyl phthalate | | | | | 20 | | |
| | Additive | (c) | Mercaptosilane | KBM-803 | 2.5 | — | 1.0 | 4.0 | — | 3.0 | 2.0 |
| | | (c) | Aminosilane | KBM-573 | — | 3.0 | 1.5 | — | 3.0 | — | — |
| | | (b) | HDI isocyanurate | SUMIDUR N3300 | 1.5 | — | 3.5 | — | — | 2.0 | — |
| | | (b) | TDI isocyanurate | TAKENATE D204 | — | 4.3 | — | 2.0 | — | — | 1.5 |
| | | — | HDI biuret | DESMODUR N3200 | — | — | — | — | 1.5 | — | — |
| Curing agent | Intermediate | (d) | Polyether polyol | PREMINOL 3012 | | | | | 100 | | |
| | | (g) | Carbon black | ASAHI CARBON #70 | | | | | 40 | | |
| | | (h) | Plasticizer | Diisononyl phthalate | | | | | 90 | | |
| | Additive | (e) | Ethylenediamine PPG | EDP-300 (Mw: 300, tetra-functional) | 2.5 | — | — | 1.5 | 2.5 | 6.0 | — |
| | | | | EDP-1100 (Mw: 1100, tetra-functional) | — | 4.0 | 3.5 | 2.0 | — | — | 3.0 |
| | | (f) | Amine catalyst | U-CAT660M | 5.0 | 6.0 | 3.2 | 7.0 | 5.0 | 3.0 | 0.5 |

TABLE 2

| | | Example | | | | Comparative Example | | |
|---|---|---|---|---|---|---|---|---|
| Item | Evaluation condition | 1 | 2 | 3 | 4 | 1 | 2 | 3 |
| Fast curability | After short-time curing (60° C., 10 minutes) | A | A | A | A | A | A | B |
| Non-primer adhesiveness | After curing (23° C., 50% RH, 72 hours) | A | A | A | A | A | B | A |
| Hydrothermal aging resistance | Hydrothermal aging resistance (85° C., 85% RH, 300 hours after curing) | A | A | A | A | B | B | A |
| Hardness | Shore-A | 42 | 43 | 40 | 41 | 39 | 55 | 43 |

Although the sample prepared by using the urethane composition of Comparative Example 1 containing 1.5 mass % of HDI biuret relative to 100 parts by mass of the urethane prepolymer (a) in the main agent (A) had an excellent non-primer adhesiveness with a fracture mode of cohesion failure and an excellent Shore A hardness of 39, peeling occurred in the evaluation on the hydrothermal aging resistance, so that the sample was evaluated as "B".

Although the sample prepared by using the urethane composition of Comparative Example 2 containing 6.0 parts by mass of the polyether polyol having 4 or more hydroxy groups (e) relative to 100 parts by mass of the polyether polyol (d) in the curing agent (B) was excellent in the fast curability, peeling occurred in the evaluation on the non-primer adhesiveness and the evaluation on the hydrothermal aging resistance, with an excessively large Shore A hardness of 55, so that the sample was evaluated as "B".

The sample prepared by using the urethane composition of Comparative Example 3 containing 0.5 parts by mass of the amine catalyst (f) relative to 100 parts by mass of the polyether polyol (d) in the curing agent (B) had an excellent bonding state in the non-primer adhesiveness evaluation, with a fracture mode of cohesion failure and an excellent Shore A hardness of 43, peeling occurred in the fast curability evaluation, so that the sample was evaluated as "B".

In contrast, the sample prepared by using any of the urethane compositions in Examples 1 to 4 in the scope of the present invention had excellent evaluation results in any of the fast curability, the non-primer adhesiveness, the hydrothermal aging resistance and the Shore A hardness.

The invention claimed is:

1. A two-part curable urethane composition comprising a main agent (A) and a curing agent (B), wherein
   the main agent (A) contains a urethane prepolymer (a), an isocyanurate-modified polyisocyanate compound (b), and a silane coupling agent (c), and a content of the isocyanurate-modified polyisocyanate compound (b) is 0.5 to 5.0 parts by mass relative to 100 parts by mass of the urethane prepolymer (a) and a content of the silane coupling agent (c) is 0.5 to 5.0 parts by mass relative to 100 parts by mass of the urethane prepolymer (a), and
   the curing agent (B) contains a polyether polyol having two or three hydroxy groups (d), a polyether polyol having 4 or more hydroxy groups (e), and an amine catalyst (f), and a content of the polyether polyol having 4 or more hydroxy groups (e) is 1.0 to 5.0 parts by mass relative to 100 parts by mass of the polyether polyol having two or three hydroxy groups (d) and a content of the amine catalyst (f) is 1.0 to 10.0 parts by mass relative to 100 parts by mass of the polyether polyol (d).

2. The two-part curable urethane composition according to claim 1, wherein the urethane prepolymer (a) is a reaction product of a polyether polyol (a-1) having a weight average molecular weight of 8,000 or more and a diphenylmethane diisocyanate (a-2).

3. The two-part curable urethane composition according to claim 1, wherein at least one of the main agent (A) and the curing agent (B) contains a carbon black (g), and a total content of the carbon black (g) is 10 to 30 mass % relative to the total amount of the main agent (A) and the curing agent (B).

4. The two-part curable urethane composition according to claim 1, having an equivalent ratio of NCO/OH groups of 1.0 to 1.5 in the main agent (A) and the curing agent (B).

5. The two-part curable urethane composition according to claim 2, wherein at least one of the main agent (A) and the curing agent B) contains a carbon black (g), and a total content of the carbon black (g) is 10 to 30 mass % relative to the total amount of the main agent (A) and the curing agent (B).

6. The two-part curable urethane composition according to claim 2, having an equivalent ratio of NCO/OH groups of 1.0 to 1.5 in the main agent (A) and the curing agent (B).

7. The two-part curable urethane composition according to claim 3, having an equivalent ratio of NCO/OH groups of 1.0 to 1.5 in the main agent (A) and the curing agent (B).

8. The two-part curable urethane composition according to claim 5, having an equivalent ratio of NCO/OH groups of 1.0 to 1.5 in the main agent (A) and the curing agent (B).

* * * * *